Dec. 8, 1964     H. M. LINHART     3,160,444
FLUID PRESSURE BRAKE APPARATUS WITH PERIODIC
ACKNOWLEDGEMENT TYPE SAFETY CONTROL
Filed Dec. 20, 1962
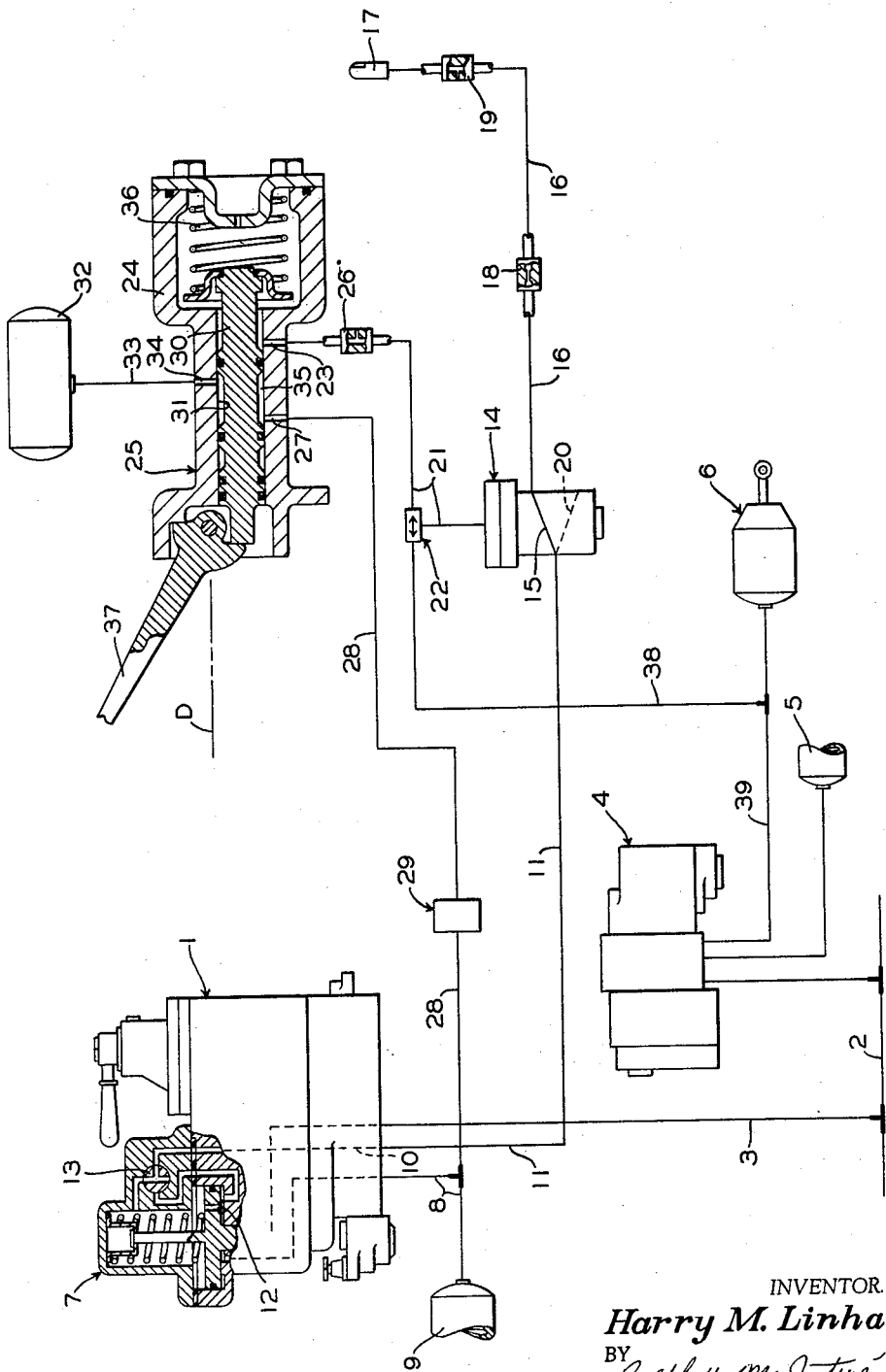
INVENTOR.
*Harry M. Linhart*
BY
*Ralph U. McIntire, Jr.*
*Attorney*

3,160,444
FLUID PRESSURE BRAKE APPARATUS WITH PERIODIC ACKNOWLEDGEMENT TYPE SAFETY CONTROL

Harry M. Linhart, East McKeesport, Pa., assignor to Westinghouse Air Brake Company, Wilmerding, Pa., a corporation of Pennsylvania
Filed Dec. 20, 1962, Ser. No. 246,210
6 Claims. (Cl. 303—19)

This invention relates to fluid pressure operable brake apparatus with periodic acknowledgment safety control means which requires certain periodic acknowledging operations by the operator of the vehicle to forestall a penalty control operation, such as a brake application, which will otherwise be effected automatically by the safety control means should the operator fail to perform said acknowledgement operations.

Some of the presently known safety devices, which are intended to be used with the braking system of a vehicle, such as the well-known "dead-man" valve, for causing the brakes to be applied automatically in the event the operator becomes incapacitated, are inadequate due to the ease with which the intended purpose may be defeated by placing a weight on the foot pedal, for example. Other types of safety control apparatus, which require periodic acknowledging operations by the operator to prevent a penalty control operation, have been devised, some of which operate on a basis of time intervals while others operate on a basis of increments of distance traveled. In some instances, however, the latter-mentioned apparatus, due to its complexity in structure and function, has been found to be susceptible to malfunctioning and failure as well as being costly to produce.

The object of the present invention, therefore, is to provide an improved safety control apparatus of the periodic acknowledging type for use primarily with fluid pressure brake apparatus of railway vehicles, though not necessarily limited thereto, said improved safety control apparatus being characterized by simplicity in structure and, therefore reliability in operation.

The invention comprises a fluid pressure safety control circuit interposed in the safety control pipe between the engineer's automatic brake valve and a warning device, such as a whistle, via which whistle fluid pressure may be released from said control pipe at a restricted rate. Reduction of fluid pressure in the control pipe, unless checked before reaching a certain low value, will effect a penalty brake application. To prevent the penalty brake application, the operator is required to operate a foot pedal associated with a foot valve device to cause fluid pressure to be supplied from a timing reservoir to a relay valve device which operates responsively to such pressure above a predetermined pressure to a closed position and is maintained therein to cut off venting of the control pipe to atmosphere via the whistle. If the operator fails to operate the foot pedal within a predetermined time interval, fluid pressure in the control pipe continues to reduce to a value below the critical low value and thus causes a penalty brake application to be effected. The time interval is determined by the capacity of the timing reservoir and an atmospheric choke via which said timing reservoir is vented to atmosphere while in communication with the relay valve. Thus, upon expiration of the time interval, that is, upon reduction of fluid pressure in the timing reservoir to a value below the predetermined value, the relay valve device is operative to an open position in which the control pipe is vented to atmosphere via the whistle. Thus, the operator must demonstrate alertness when he hears the whistle sound by momentarily letting up on the foot pedal, which serves to recharge the timing reservoir at a rapid rate, and then again depress the foot pedal after the expiration of four or five seconds to again supply fluid pressure to the relay valve device for operating it to its closed position. Brake cylinder pressure is also connected to the relay valve device via a double check valve device interposed between the safety control circuit and a pipe connecting to the brake cylinder fluid pressure supply pipe, the brake cylinder pressure, when exceeding the pressure in the safety control circuit, being effective for maintaining the relay valve device in its closed position thereby rendering the safety control circuit ineffective during such time that a brake application above a predetermined magnitude is in effect.

The single figure drawing shows a schematic arrangement, partly in section, of a safety control circuit with a brake system of a railway locomotive and embodying the invention.

Description and Operation

For purposes of illustrating and application of the safety control apparatus embodying the invention, said apparatus is shown in the drawing as being operatively connected to brake control equipment of the fluid pressure operable type of a railway locomotive. The locomotive brake control equipment may be of any suitable type such as that fully described and illustrated in Instruction Pamphlet No. 5066, dated March 1957, and published by Westinghouse Air Brake Company, said brake control equipment being designated "24–RL Locomotive Brake Equipment." Since a detailed description of the brake control equipment is not deemed essential to an understanding of the invention, and since reference may be had to the above-mentioned publication, the brake control equipment as shown in the drawing will be only very briefly described. Such equipment comprises an engineer's automatic brake valve device 1 designated in the above-mentioned pamphlet as the "DS–24 Brake Valve" and manually operable by the engineer for controlling fluid pressure in a brake pipe 2 connected via a branch pipe or conduit 3 to said engineer's brake valve device. As is well known by those skilled in the art, operation of the engineer's brake valve device 1 for effecting a reduction of fluid pressure in the brake pipe 2 causes a brake control valve device 4, designated in the above-mentioned pamphlet as the "D–24 Control Valve," to effect supply of fluid under pressure from a source such as an auxiliary reservoir 5 to a brake cylinder device 6, whereby a brake application corresponding to the degree of reduction in brake pipe pressure is applied to the locomotive wheels (not shown). Operation of the automatic brake valve device 1 for effecting restoration of fluid pressure in the brake pipe 2 to a preselected normal value causes the brake control valve device 4 to effect venting of brake-applying pressure from the brake cylinder device 6 and thereby release of the brake application.

One of the components of the automatic brake valve device 1 is an application portion 7 comprising valve means (not shown) operated by a piston subjected on one side to fluid pressure in a pressure chamber adjacent thereto, said chamber being supplied with fluid under pressure via a pipe 8 from a source, such as a main reservoir 9 which may be charged with fluid at a pressure of 140 p.s.i., for example, while the opposite side of said piston is subjected to the force of a biasing spring and fluid pressure in a control chamber adjacent thereto, said control chamber having one end of a safety control passage 10 opening thereinto, while the other end of said control passage connects to one end of a safety control pipe 11. Both the passage 10 and the pipe 11 are charged, at a restricted rate, from the main reservoir 9 via the pressure chamber and the control chamber of the application portion 7, which are connected by a choked passage 12 extending through the piston from one side thereof to the other. When fluid pressure in the control passage 10 and, therefore, in the control chamber is reduced below a preselected critical low value such as 90 p.s.i., for example, the piston-operated valve means is actuated by the opposing pressure in the pressure chamber to a brake application position, whereby the automatic brake valve device 1 is actuated to cause a reduction of fluid pressure in brake pipe 2 for effecting a brake application, as above described. When fluid pressure in the control passage 10 is restored to a value above 90 p.s.i., the piston-operated valve means is returned to a normal position in which the brake valve device 1 effects restoration of normal fluid pressure in the brake pipe 2, and the control valve device 4 effects a release of the brake application.

It should be understood that each of the cars making up a train is provided with a brake control valve device similar to the brake control valve device 4 and that the brake pipe 2 extends the entire length of the train so that the brakes on the entire train are controlled from the engineer's automatic brake valve device 1.

In locomotive brake equipment of the type above described, the safety control passage 10 is normally connected via pipe 11 to a safety control device or devices such as the "dead-man" valve device above described, and an audible or visible warning device for indicating that the safety control devices have been actuated in response to an emergency situation.

A cut-out cock 13, manually operable from the exterior of the automatic brake valve device 1, is interposed in safety control passage 10 between the control chamber of the service application portion 7 of said valve device and the pipe 11, whereby, in the event of undesirable pressure reduction in said safety control passage due to malfunctioning of the safety control devices or excessive leakage of fluid pressure in the safety control system, the cut-out cock may be operated to close off communication between said service application portion and the safety control devices to prevent untimely application of the brakes due to said malfunctioning of safety control devices or excessive leakage therein.

In the present invention, pipe 11 is connected to a two-position relay valve device 14 including, though not shown, piston-operated valve means spring biased toward an open position in which a communication 15, indicated diagramatically in the drawing by a solid line, is open between safety control pipe 11 and an atmospheric vent pipe 16 which has connected thereto an audible warning device such as a whistle 17, for example. A choke 18 as well as an atmospheric vent choke 19 are interposed in vent pipe 16 for controlling the rate of escape of pressurized fluid from safety control pipe 11 to atmosphere when communication 15 is open.

The piston-operated valve means in the relay valve device 14 is operable responsively to fluid in a control chamber (not shown) at a pressure adequate for overcoming the opposing force of the biasing spring acting on said valve means to a closed position, indicated diagrammatically in the drawing as a broken line 20, in which closed position communication 15 between pipes 11 and 16 is closed.

The control chamber (not shown) of the relay valve device 14 is connected to one end of a fluid pressure delivery pipe 21, in which a double check valve 22 is interposed for a purpose to be hereinafter disclosed, the other end of said pipe being connected to an outlet or delivery port 23 formed in a casing 24 of a foot valve device 25. An atmospheric vent choke 26 is also interposed in pipe 21, between the double check valve device 22 and the foot valve device 25.

The foot valve device 25 is also provided with an inlet port 27 to which one end of a fluid pressure supply pipe 28 is connected, the other end of said pipe being connected to pipe 8 leading from main reservoir 9. A feed valve device 29 is interposed in pipe 28 between reservoir 9 and inlet port 27, said feed valve device being of the well-known type which may be adjusted to permit delivery of pressurized fluid from said reservoir, via pipe 28, to the inlet port 27 at a pressure determined by the adjustment.

The foot valve device 25 further comprises a spool-type valve 30 axially operable within a bore 31 formed coaxially in the casing 24. A timing reservoir 32 is connected via a pipe 33 to a port 34 formed in casing 24, said pipe and therefore said reservoir being constantly in registry, via said port, with an annular groove 35 formed on the spool valve 30. The spool valve 30 is biased axially in a left-hand direction, as viewed in the drawing, by a spring 36 acting against one end thereof, toward a pressure charging position in which port 34 is placed in communication with inlet port 27 via groove 35 for charging timing reservoir 32 with fluid from main reservoir 9 via pipes 8, 28 and 33 at a pressure established by the setting of feed valve device 29. The end of spool valve 30 opposite spring 36 is engaged by a pivotally mounted foot pedal 37, which normally occupies a released or raised position, in which it is shown in the drawing, when said spool valve is in its charging position. The foot pedal 37 is pivotally operable to a depressed or lowered position, indicated diagrammatically by a broken line D in the drawing, for causing the spool valve 30 to move axially in a right-hand direction to a pressure release position in which annular groove 35 is moved out of registry with inlet port 27 and into registry with outlet port 23, the latter port thus being placed in communication, via said groove, with port 35. With outlet port 23 in communication with port 34, fluid under pressure in reservoir 32 flows therefrom to the control chamber of the relay valve device 14 via pipe 33, port 34, groove 35, outlet port 23 and pipe 21 past double check valve device 22. Moreover, as long as spool valve 30 is maintained in its pressure release position, pressurized fluid trapped in timing reservoir 32 and the control chamber of the relay valve device 14 is gradually dissipated to atmosphere via the atmospheric vent choke 26 at a predetermined rate.

In operation, it may be assumed that the vehicle on which the apparatus embodying the invention is mounted, is underway and in motion, that the main reservoir 9 is fully charged with pressurized fluid, that the foot pedal 37 of the foot valve device 25 has just been operated to its depressed position (in response to a preselected signal to be more fully explained hereinafter) to cause spool valve 30 to be moved to its pressure release position, whereby pressurized fluid trapped in timing reservoir 32 and the control chamber of the relay valve device 14 begins to dissipate via the atmospheric vent choke 26, as above explained. At the onset of such dissipation of pressurized fluid from timing reservoir 32 and the control chamber of the relay valve device 14, the pressure of said fluid is at the degree corresponding to the setting of the feed valve device 29, such as 45 p.s.i., for example, and therefore adequate for momentarily maintaining the piston-operated valve means (not shown) in the relay valve device 14 in its closed position. When the pressure of fluid in timing reservoir 32 and in the control chamber of the relay valve device 14 has been gradually reduced to a certain low value, such as 25 p.s.i., the biasing spring (not shown) in said relay valve device is effective for restoring the piston-operated valve means to its open position whereby, as above described, fluid pressure is vented from the safety control pipe 11 via communication 15, pipe 16, vent choke 19 and the whistle 17, which emits an audible warning sound. The time interval covering the period from the instant that dissipation of pressurized fluid from the timing reservoir 32 and the control chamber of the relay valve device 14 commences until the warning sound from whistle 17 is emitted, is, of course, determined by the volume of said timing reservoir and the flow capacity of the vent choke 26, and could be a predetermined interval falling within a range between a half-minute and two minutes, for example.

Upon hearing the warning sound emitted by the whistle 17, the operator is thus apprised of the venting of safety control pipe 28, which, if allowed to continue unchecked, will cause a penalty brake application to be effected, as above noted. To prevent such a penalty brake application, the operator must cause pressurized fluid to be applied to the control chamber of the relay valve device 14 to cause the piston-operated valve means therein (not shown) to be operated from its open position to its closed position before fluid pressure in safety control pipe 11 has reduced to the critical low value at which an application is effected. The choke 18 in pipe 16 and the vent choke 19, as well as the whistle 17 itself, all serve to determine the rate of venting of pipe 11 and, therefore, the time interval before the pressure in said pipe has reduced to the critical low value at which an application will be effected. To prevent the penalty brake application, and thereby demonstrate his alertness, the operator, upon hearing the sound of whistle 17, momentarily lets up on the foot pedal 37 to allow it to assume its released position effected by the biasing action of spring 36 which now operates the spool valve 30 to its pressure charging position. The operator allows foot pedal 37 to remain in its released position for a period of time, such as 3 or 4 seconds, for example, sufficient to allow full recharging of timing reservoir 32 to the pressure established by the feed valve device 29 or 45 p.s.i.

Upon expiration of the 3 or 4 seconds, which the operator mentally estimates to insure full recharging of timing reservoir 32, the operator again depresses foot pedal 37 to its depressed position and, therefore, causes operation of spool valve 30 to its pressure release position, whereupon fluid pressure from timing reservoir 32 is again established in the control chamber of the relay valve device 14 to cause operation of the valve means therein to its closed position to cut off further venting of safety control pipe 11, thus averting a penalty brake application. The valve means in the relay valve device 14 is maintained in its closed position by fluid pressure in the control chamber until said pressure is again reduced, via vent choke 26, to 25 p.s.i. or less, at which time the biasing spring in said relay valve device moves said valve means to its open position to initiate venting of safety control pipe 11 and sounding of whistle 17 once more. Again the operator must execute the operations with the foot pedal 37 above described to prevent a penalty brake application and thereby demonstrate his alertness periodically, each cycle of such operation of the apparatus occurring at an interval falling within the half-minute to two-minute range, depending upon the volume of reservoir 32 and flow capacity of vent choke 26, which may be designed to fit the particular need.

Since the main purpose of the invention, as above stated, is to have the operator demonstrate his alertness by having to perform the functions above described to avert a penalty brake application, it follows that he should not be required to perform said functions if he is preoccupied with other duties which indicate and demonstrate his alertness. One such instance occurs at such time that the operator initiates a brake application by operating the engineer's automatic brake valve device 1, in which case it would be desirable to render the safety control circuit ineffective during the time that the operator is demonstrating his alertness otherwise.

A pipe 38 has one end connected to a brake cylinder pipe 39 via which actuating fluid pressure is supplied to the brake cylinder device 6 under the control of the control valve device 4, as above described, while the other end of pipe 38 is connected to the side of double check valve device 22 opposite pipe 21. If the operator, therefore, effects a brake application, such as a service application, for example, in which brake cylinder pressure might be in excess of 25 p.s.i. (sufficient for overcoming the effect of the biasing spring in the relay valve device 14), such brake-applying pressure is also supplied via pipe 38, past double check valve device 22 (assuming that the prevailing fluid pressure in pipe 21 is less than 25 p.s.i., otherwise fluid pressure in pipe 21 in excess of 25 p.s.i. would be sufficient to maintain the valve means in said relay valve device in its closed position) and through a portion of pipe 21 to the control chamber of said relay valve device. Prevailing pressure in excess of 25 p.s.i. in the control chamber of the relay valve device 14 is effective, as above noted, for operating the valve means in said relay valve device to its closed position and maintaining it therein as long as said prevailing pressure is in excess of 25 p.s.i., whereby conduit 11 is cut off from atmosphere, and during such time the operator is not required to periodically operate the foot valve device 25 to prevent a penalty brake application.

Having now described the invention, what I claim as new and desire to secure by Letters Patent, is:

1. A fluid pressure safety control system for use on a railway type vehicle, said safety control system comprising:

(a) a control pipe normally charged with fluid at a preselected pressure and in which a reduction in excess of a certain amount from said preselected pressure is effective to initiate a penalty control operation, (b) an atmospheric vent pipe via which fluid under pressure may be released from said control pipe at a restricted rate, (c) a relay valve device having a control chamber and being interposed between said control pipe and said vent pipe for controlling communication therebetween, said relay valve device comprising:

(i) valve means biased toward an open position, in which said control pipe is in communication with said vent pipe for effecting release of fluid under pressure from the control pipe, and being operable responsively to fluid in said control chamber at a pressure above a certain value to a closed position in which said communication is cut off and venting of said control pipe terminated, (d) a delivery pipe via which pressurized fluid may be delivered to said control chamber of said relay valve device, (e) a timing reservoir chargeable with pressurized fluid, (f) a supply pipe via which fluid at a preselected pressure in excess of said certain pressure is supplied to said timing reservoir, (g) a manually operable valve device operatively interposed between said supply pipe and said timing reservoir and between said timing reservoir and said delivery pipe, said manually operable valve device being selectively operable from one position in which a first communication is established between said supply pipe and said timing reservoir for charging said reservoir with fluid at said preselected pressure, to a different position in which said first communication is cut off and a second communication is established between said timing reservoir and said delivery pipe for causing fluid at a pressure in excess of said certain pressure to be delivered from said timing reservoir to said control chamber of said relay valve device, and (h) an atmospheric vent choke interposed in said delivery pipe and via which pressurized fluid in said timing reservoir and said control chamber is reduced, when said manually operable valve means is in its said different position, to a value below said certain value after a prescribed interval of time for causing said valve means to be restored to its open position.

2. The combination as defined in claim 1, wherein said atmospheric vent choke is characterized by a preselected flow capacity effective for restricting reduction of fluid pressure in said timing reservoir and said control chamber, when said manually operable valve device is in its said different position, to a rate slower than the rate at which said timing reservoir is charged when said manually operable valve device is in its said one position.

3. A fluid pressure safety control system as defined in claim 1, further characterized by a warning device connected with said atmospheric vent pipe for emitting a warning signal each time said valve means is operated to its open position for venting said control pipe to atmosphere.

4. In a fluid pressure brake system for a railway type vehicle, the combination of:
  (a) a brake pipe normally charged with fluid at a predetermined pressure,
  (b) a brake cylinder device operable responsively to fluid pressure for effecting a brake application on the vehicle according to the degree of fluid pressure supplied thereto,
  (c) a control valve device operable responsively to a reduction of fluid pressure in said brake pipe for effecting supply of fluid to the brake cylinder device according to the degree of reduction in said brake pipe pressure,
  (d) application valve means operative to effect a reduciton of fluid pressure in the brake pipe,
  (e) a control pipe normally charged with fluid at a preselected pressure and effective upon a reduction in excess of a certain amount from said preselected pressure for effecting operation of the application valve means to cause a reduction of fluid pressure in the brake pipe to effect a penalty brake application,
  (f) fluid pressure responsive valve means subjectable to variable fluid pressure and operable from one position, in which a venting communication for effecting reduction of fluid pressure in said control pipe is opened, to another position, in response to fluid at a pressure above a certain value, in which said venting commununciation is closed and further reduction of fluid pressure in said control pipe is terminated until the degree of fluid pressure acting on said fluid pressure responsive valve means is reduced below said certain value,
  (g) a timing reservoir chargeable with pressurized fluid,
  (h) a supply pipe from which fluid at a predetermined pressure above said certain value may be supplied to said timing reservoir,
  (i) a delivery pipe via which pressurized fluid from said timing reservoir may be delivered to said fluid pressure responsive valve means,
  (j) a manually operable valve device operatively interposed between said supply pipe and said timing reservoir and between said timing reservoir and said delivery pipe, said manually operable valve device being selectively operable from one position, in which a first communication is established between said supply pipe and said timing reservoir for charging the timing reservoir, to a different position in which said first communication is cut off and a second communication is established between said timing reservoir and said delivery pipe for effecting operation of said valve means to its said other position, and
  (k) an atmospheric vent choke interposed in said delivery pipe and via which pressurized fluid in said timing reservoir and acting on said valve means is reduced, when said manually operable valve device is in its said different position, to a pressure below said certain value for causing said valve means to be restored to its said one position.

5. The combination as defined in claim 4, wherein said atmospheric vent choke is characterized by a preselected flow capacity effective for restricting reduction of fluid pressure in said timing reservoir and acting on said fluid pressure responsive valve means, when said manually operable valve device is in its said different position, to a rate slower than the rate at which said timing reservoir is charged when said manually operable valve device is in its said one position.

6. A fluid pressure safety control system as defined in claim 4, further characterized by a double check valve device interposed between said delivery pipe and a connecting pipe subject to operating fluid pressure supplied to said brake cylinder device, whereby to permit access of fluid pressure from said connecting pipe to said fluid pressure responsive valve means, when prevalent over fluid pressure in said delivery pipe, for effecting operation of said fluid pressure responsive valve means to its said other position when operating fluid pressure supplied to said brake cylinder device is in excess of said certain value.

References Cited in the file of this patent
UNITED STATES PATENTS

| | | |
|---|---|---|
| 2,785,931 | Gorman | Mar. 19, 1957 |
| 2,820,677 | Jados | Jan. 21, 1958 |